March 16, 1937.  G. F. RICHTER  2,073,999
HOLDER FOR STICK MATERIAL
Filed June 8, 1934  2 Sheets-Sheet 2
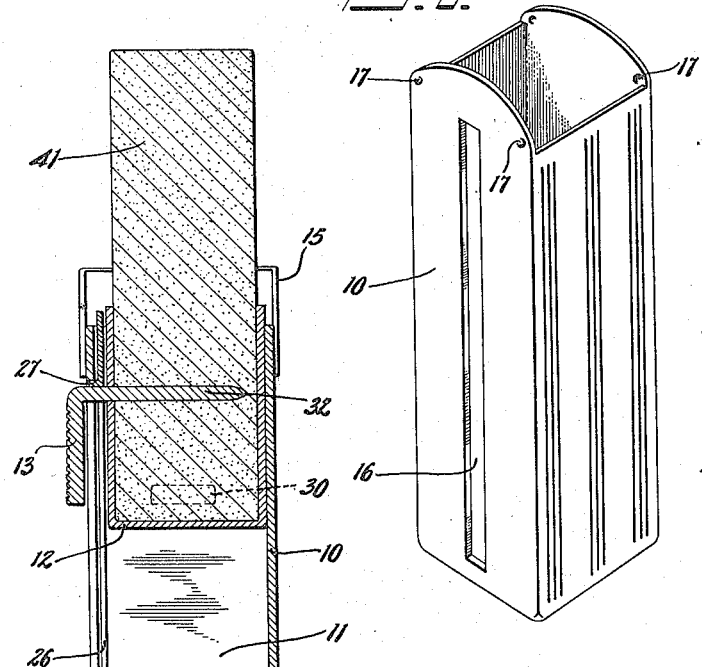
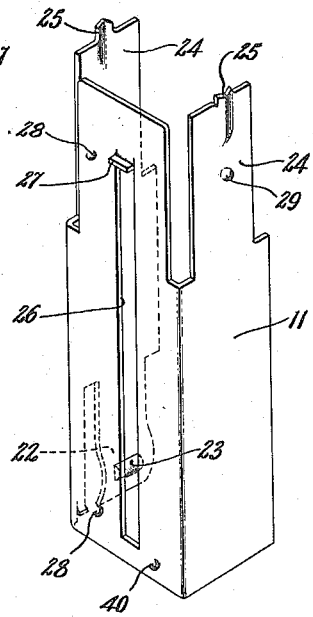
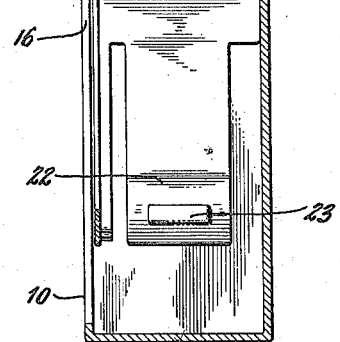
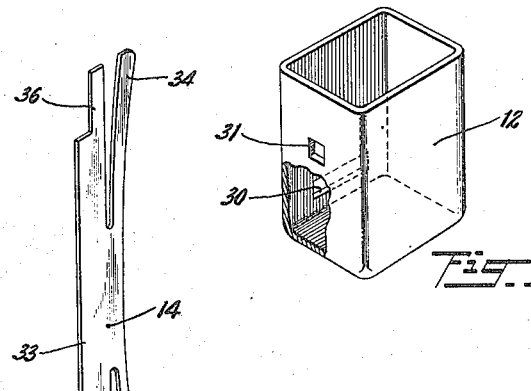
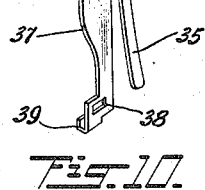
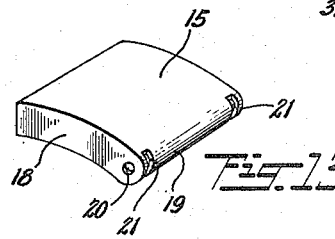
INVENTOR
GEORGE F. RICHTER.
BY
ATTORNEYS Patented Mar. 16, 1937

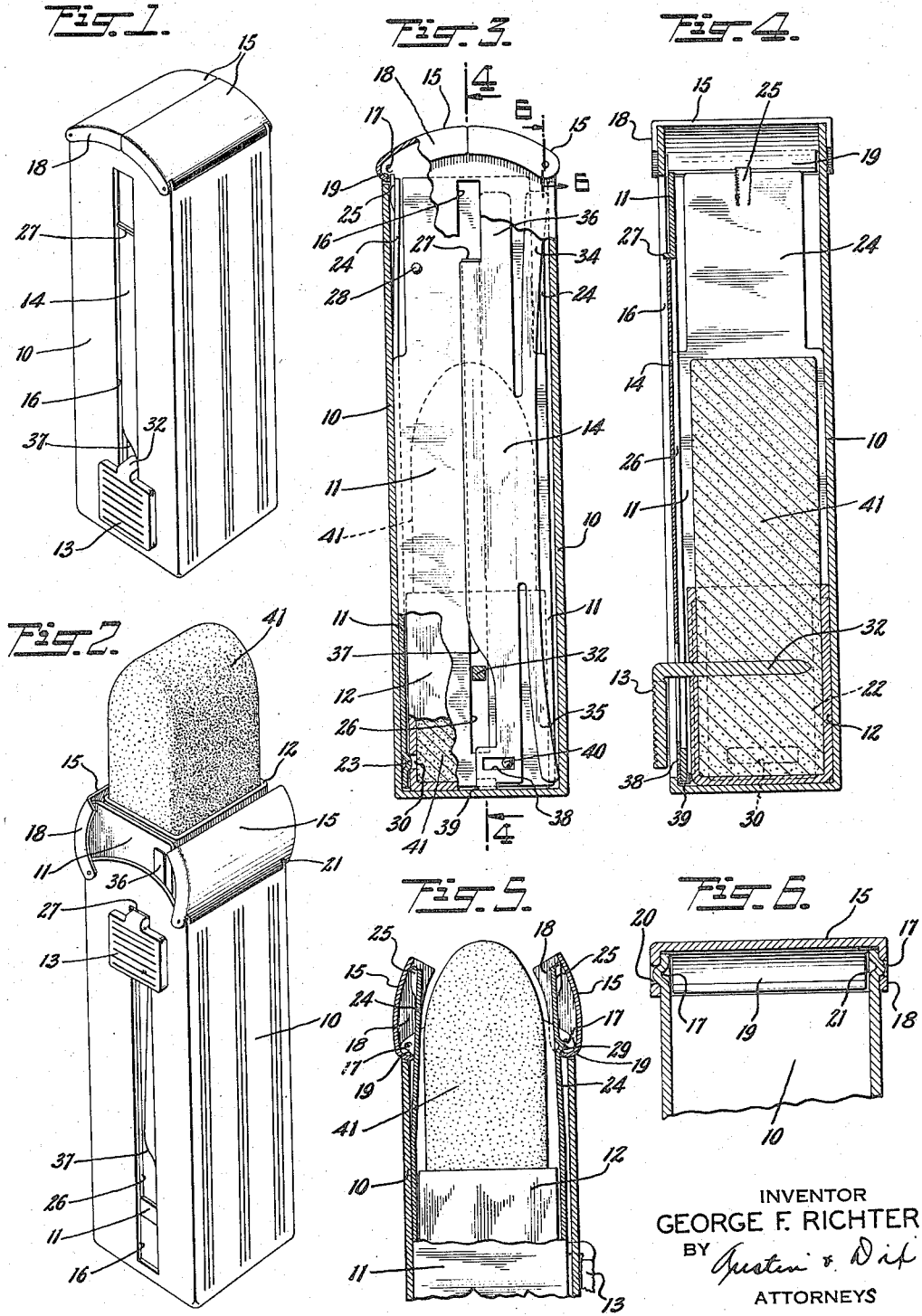

2,073,999

UNITED STATES PATENT OFFICE 2,073,999

HOLDER FOR STICK MATERIAL

George F. Richter, Bogota, N. J., assignor to Charles N. Coryell, Mamaroneck, N. Y.

Application June 8, 1934, Serial No. 729,571

8 Claims. (Cl. 206—56)

The invention relates to containers, and more particularly to containers for holding and applying stick material.

According to the invention, a container is provided comprising a holder tube having a carrier member slidably mounted therein. The holder tube has a slot through which an operating member projects for feeding the carrier member and contained stick material by a simple longitudinal motion. The container is provided with a pair of hinged covers and with a cover operator, where the operation of advancing and retracting the stick material automatically opens and closes the cover.

Suitable arrangement is also provided for closing the slot in the holder tube to prevent ingress of dirt and dust. The container is especially adapted for holding stick material which is directly applied from the stick itself, for example, a lip stick or other cosmetic.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a perspective of the container in closed condition;

Fig. 2 represents the container in full open condition, but with the stick material partly consumed;

Fig. 3 is a side elevation, with parts broken away, to illustrate the construction;

Fig. 4 is a section on the line 4—4 of Fig. 3;

Fig. 5 is a section through the upper end of the container illustrating the covers in full open condition, but with the stick material just emerging;

Fig. 6 is a section on the line 6—6 of Fig. 3;

Fig. 7 is a section similar to Fig. 4, but with the stick material fully advanced;

Fig. 8 illustrates the holder tube by itself;

Fig. 9 illustrates the cover operator by itself;

Fig. 10 illustrates the slot closer;

Fig. 11 illustrates the carrier member;

Fig. 12 illustrates the thumb-piece; and

Fig. 13 is a perspective of one of the covers.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the container comprises essentially the holder tube 10, cover operator 11, carrier 12, thumb-piece 13, slot closer 14 and a pair of covers 15 (Figs. 8 to 13). These parts are assembled and fitted together in the manner set forth more in detail below.

The holder tube 10 (Fig. 8) is made of suitable sheet metal, as are all of the other parts of the container. The holder tube is of generally square or rectangular cross section having a closed bottom and an open top and a longitudinal slot 16 in one side wall thereof. The holder tube also has a plurality of struck out portions or nibs 17 to which the covers 15 are hinged in the manner explained below.

The holder tube is provided with a pair of cover members 15 (Fig. 13), each of which has a top wall, a pair of side walls or flanges 18 and a curved end flange 19. The side walls are provided with openings 20 and the end wall 19 is provided with notches 21 for the purpose of hinging these covers to the holder tube.

Referring now to Fig. 9, the cover operator 11 is roughly U-shaped in cross section and is provided with a spring leg 22 having a detent 23, a pair of spring arms 24 having depressed ridges 25, one arm 24 having a depressed nib 29. The cover operator 11 is also provided with a longitudinal slot 26 having at its upper end a flange or abutment 27. The cover operator 11 is also provided with projecting nibs 28 and 40 to assist in correctly spacing the wall of the cover operator from the wall of the holder tube, as will be explained more in detail.

The carrier member 12 is provided with a slot 30 for engagement with detent 23 and is also provided with a hole 31 into which frictionally fits the tang 32 of thumb-piece 13.

Referring to Fig. 10, the slot closer 14 comprises a plate 33 of thin spring metal having spring arms 34 and 35, a reduced upper end 36, a cam surface 37, a slot 38 and a hook 39.

One manner of assembling the parts of the container is as follows, it being understood that minor changes may be made in the manner of assembling:

The carrier 12 is placed within the cover operator 11 (either with or without the stick material 41 in place) with the detent 23 engaged in the slot 30. The slot closer 14 is then placed against the wall of the cover operator, overlying the slot 26 with the reduced upper end 36 engaging flange 27, and slot 38 being disposed over nib 40 with the hook 39 around the bottom of the cover operator 11, as illustrated especially in Figs. 3, 4 and 7.

The covers 15 are then applied to the top of the holder tube 10 with the side walls of the holder tube disposed within the slots 21 of the covers and the nibs 17 disposed in the holes 20 of the covers, as illustrated particularly in Fig. 6. The springiness of the metal of the covers and holder tube permits this assembly in a simple manner. The carrier 12, cover operator 11 and slot closer 14, as assembled above, are then slid down within the holder tube to the position shown in Fig. 3. The tang 32 of the thumb-piece 13 is then inserted through the slots 16 and 26 and into the hole 31, this tang being frictionally held to the latter.

To advance the stick material from the position illustrated in Figs. 1 and 3 to the position illustrated in Figs. 2, 5 and 7, it is only necessary to push the thumb-piece 13 upwardly along the slot 16. The initial movement of the carrier 12 carries the cover operator 11 upwardly a short distance until the flange 27 engages the top of slot 16. This preliminary operation causes the ridges 25 to engage the top walls of the covers 15, as illustrated in Fig. 5, causing them to open. Before the flange 27 engages the top of slot 16, the nib 29 over-rides the end flange 19 of one cover 15, as illustrated in Fig. 5. This prevents retracting movement of the cover operator until it is forced down by the retracting movement of the thumb-piece 13. It will be noted that the opening position of the covers 15 is limited by the engagement of the end flanges 19 with the spring arms 24, as illustrated in Fig. 5.

Since the cover operator has reached the end of its travel, further movement of the thumb-piece 13 causes the carrier 12 to disengage the detent 23 from the slot 30 and from this point the carrier is fed independently of the cover operator 11 to its uppermost advanced position, as illustrated in Figs. 2 and 7.

It should be noted that the initial upward movement of the cover operator 11 also carries bodily the slot closer 14. The longitudinal movement of slot closer 14 stops with that of the cover operator 11 and further advancement of the thumb-piece 13 engages the cam surface 37 of slot closer 14, pushing the plate 33 laterally against the spring of arms 34 and 35.

To close the container, the thumb-piece 13 is retracted moving the carrier 12 until the slot 30 again engages the detent 23. Further retracting movement of thumb-piece 13 forcibly moves the cover operator 11 together with the slot closer 14, causing the ridges 25 to engage the end flanges 19 of the covers. The spring action of the spring arms 24 against the end flanges 19 resiliently hold the covers closed, as illustrated in Fig. 3.

Furthermore, as soon as the thumb-piece 13 slides back over cam surface 37 of slot closer 14, the spring arms 34 and 35 engaging the side wall of the holder tube 10 cause the plate 33 to overlap slot 16 tightly, thereby sealing the holder from the ingress of dust and other foreign material.

The container is adapted to carry any kind of stick material which it may be desired to apply directly from the stick itself, as for example, lip sticks, eyebrow pencils, rouge sticks, or other stick of cosmetic or medicinal material. Other uses may also be made of the container by those skilled in the art.

Thus, a container is provided which is simple to operate and inexpensive to make. There are relatively few parts and these parts are rugged and there is nothing to get out of order. The covers are opened and closed, the slot is opened and closed by the simple longitudinal movement of the carrier member to advance and retract the stick material. When closed, the container is sealed to prevent ingress of dirt. Furthermore, the container, as a whole, is attractive in appearance and rugged in construction.

While certain novel features of the invention have been disclosed and are pointed out in the annexed claims, it will be understood that various omissions, substitutions and changes may be made by those skilled in the art without departing from the spirit of the invention.

What is claimed is:

1. In a container, a body having projecting side walls, each side wall having a projecting hinge portion, a cover having a top wall, side walls and an end wall, said second side walls having holes in which said hinge portions are positioned, said end wall having notches in which said projecting side walls are positioned.

2. In a container, a holder tube, a pair of covers hinged to opposite sides of the top of the holder tube, each cover having a downwardly projecting end member, an inner operating member within said holder tube comprising a pair of spring arms bearing against said end members to hold the covers closed.

3. In a container, a holder tube, a pair of covers hinged to the top of the holder tube, each cover having a downwardly projecting end member, an inner member within said holder tube comprising a pair of spring arms bearing against said end members to hold the covers closed, and means to advance said inner member to open said cover.

4. In a container, a holder tube having a closed bottom and an open top with a slot in its side wall, a pair of cover sections, each cover section comprising a top plate and a depending flange, means for pivoting said cover sections to said tube at said depending flanges, a cover operator comprising a U-shaped member having a side wall provided with a slot in line with said first slot and spring arms bearing against said flanges, a carrier disposed within said cover operator and having a finger piece projecting through said aligned slots, said cover operator having a depending resilient catch at the bottom thereof, said carrier having an abutment engageable with said catch, a slot closer comprising a plate slideable between said holder tube and cover operator, one edge of said plate having spring arms, the other edge of said plate having a cam portion engageable with said finger piece.

5. In a container, a holder tube having a slot in its side wall, a cover, means for pivoting said cover to said tube, a cover operator having a side wall provided with a slot in line with said first slot and a spring arm bearing against said cover, a carrier disposed within said cover operator and having an operating member projecting through said aligned slots, said cover operator having a depending resilient catch at the bottom thereof, said carrier having an abutment engageable with said catch, whereby the initial upward movement of said operating member carries both said carrier member and said cover operator causing said cover operator to open said cover sections, said cover operator having an abutment which then engages an abutment on said holder tube permitting the carrier member to continue independently of the cover operator.

6. In a container, a holder tube substantially of rectangular cross section and having a closed bottom and an open top with a slot in its side wall, a pair of cover sections, each cover section comprising a top plate and a depending end flange, means for pivoting said cover sections to said tube at said depending end flanges, a cover operator comprising a U-shaped member having a side wall provided with a slot in line with said first slot and spring arms bearing against said cover flanges, a carrier disposed within said cover operator and having a finger piece projecting through said aligned slots, said cover operator having a depending resilient catch at the bottom thereof, said carrier having an abutment engageable with said catch, whereby the initial upward movement of said finger piece carries both said carrier member and said cover operator causing said cover operator to open said cover sections, said cover operator having an abutment which then engages an abutment on said holder tube permitting the carrier member to continue independently of the cover operator.

7. In a container, a holder tube having a closed lower end, an open top and a slot in its side wall, a cover hinged to the top and comprising a top plate and an integral depending member, a carrier assembly comprising a carrier slidable within said holder tube and a finger piece projecting through said slot, said carrier having a recess, a cover operator within said holder tube having a resilient catch for engaging said recess and having a spring arm engaging said member, whereby said spring arm, when in its lower position, holds said cover closed and, when moved upwardly, pushes the cover open.

8. In a container, a holder tube having an open top and a slot in its side wall, a cover hinged to the top and comprising a top plate and a depending member, a carrier assembly comprising a carrier slidable within said holder tube and a finger piece projecting through said slot, a cover operator within said holder tube having a resilient catch-and-recess connection with said carrier assembly and having a spring arm engaging said member, whereby said spring arm, when in its lower position, holds said cover closed and, when moved upwardly, pushes the cover open.

GEORGE F. RICHTER.